Aug. 28, 1962   J. E. CLIFFORD ET AL   3,051,638
METHOD OF APPARATUS FOR MAKING A TAPERED THREAD
Filed March 12, 1959   2 Sheets-Sheet 1
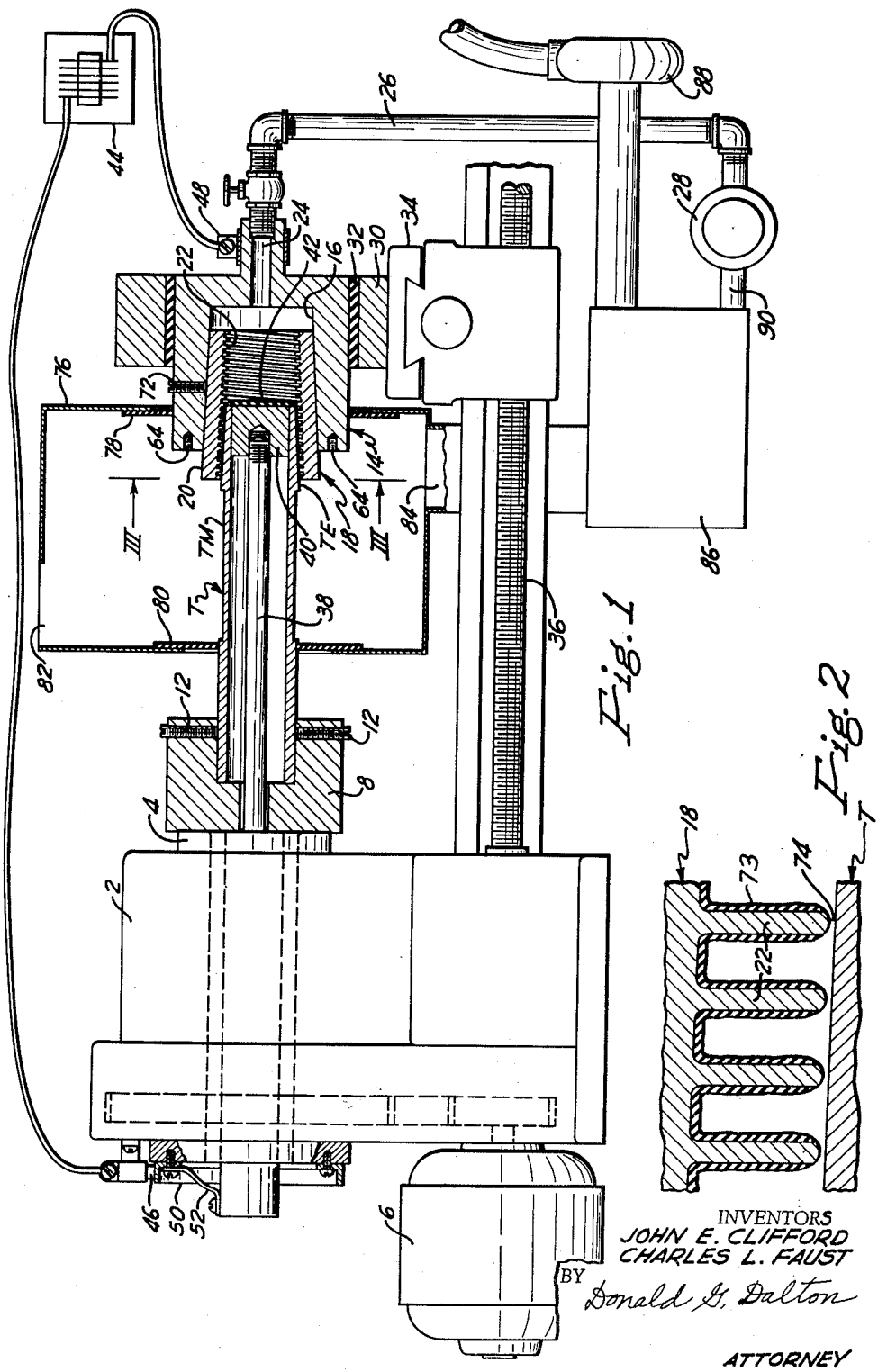
INVENTORS
JOHN E. CLIFFORD
CHARLES L. FAUST
BY
Donald G. Dalton
ATTORNEY Aug. 28, 1962  J. E. CLIFFORD ET AL  3,051,638
METHOD OF APPARATUS FOR MAKING A TAPERED THREAD
Filed March 12, 1959  2 Sheets-Sheet 2

INVENTORS
JOHN E. CLIFFORD
CHARLES L. FAUST
BY Donald G. Dalton
ATTORNEY

United States Patent Office

3,051,638
Patented Aug. 28, 1962

3,051,638
METHOD AND APPARATUS FOR MAKING A TAPERED THREAD
John E. Clifford and Charles L. Faust, Columbus, Ohio, assignors, by mesne assignments, to United States Steel Corporation, Pittsburgh, Pa., a corporation of New Jersey
Filed Mar. 12, 1959, Ser. No. 798,919
6 Claims. (Cl. 204—143)

This invention relates to a method and apparatus for making tapered threads and more particularly for making such threads on tubular products. The common way of making such threads is to cut the thread by means of a tool which may be made of high carbon steel, carbide or the like. In the cutting operation the tool becomes worn and must be resharpened periodically. The wear on the tool results in the threads on different products being non-uniform since a worn tool will not cut a thread of the same dimension as a new or resharpened tool. The cost of re-sharpening the tool is also a major item. The problem of tool wear becomes more important as the hardness of the metal of the tube increases. For example, in deep oil well casing, steel of considerable hardness is used and wear on the tool is such that it must be frequently re-sharpened. If the depth of oil wells continues to increase it is conceivable that the time will arrive when the tube will be made of metal so hard that it cannot be cut economically. While it is old to remove metal from a workpiece by means of electrolytic action as shown in Keeleric Patent No. 2,826,540, dated March 11, 1958, and Hartley Patent No. 2,848,401, dated August 19, 1958, the cutting of threads is a very complicated procedure which raises problems not present in removing metal from workpieces such as shown in the patents.

It is therefore an object of our invention to provide a method of making tapered threads without the use of a cutting tool for removing metal therefrom.

Another object is to provide apparatus suitable for carrying out our method.

Still another object is to provide a method and apparatus for forming threads which, for one setup, will be uniform on successive workpieces regardless of the number of workpieces threaded.

These and other objects will be more apparent after referring to the following specification and attached drawings, in which:

FIGURE 1 is a view, partly in section, of the apparatus of our invention as used in cutting male threads;

FIGURE 2 is an enlarged detail view of the die of FIGURE 1;

Figure 3:
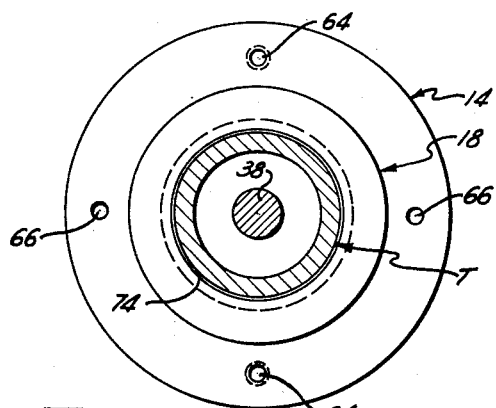
FIGURE 3 is a view taken on the line III—III of FIGURE 1.

Referring more particularly to the drawings, reference numeral 2 indicates the body of a lathe having a rotating spindle 4 mounted thereon. The spindle 4 may be rotated in the usual manner from a motor 6. A pot chuck 8 is mounted on the spindle 4 for rotation therewith and carries four set screws 12. Spaced from the chuck 8 is a sleeve 14 having a frusto-conical opening 16 therein for receiving a cathode die 18 having a frusto-conical outer surface 20. The die 18 has a plurality of teeth 22 on its inner surface which preferably have zero degree flanks. The sleeve 14 has an axial opening 24 on its rearward end for receiving a flexible hose 26 which is connected to a pump 28. The sleeve 14 is received in lathe block 30 and is insulated therefrom by means of insulation 32. Block 30 is mounted on saddle 34 which is movable toward and away from chuck 8 by means of lead screw 36. A workpiece or tube T is centered in the chuck 8 by means of the set screws 12 and a rod 38 of brass or other electrically conducting material is mounted within the spindle 4 for rotation therewith and passes through chuck 8 into the tube T. A plug 40 having a layer of insulation 42 on its outer surface is threaded on the free end of rod 38 and closes the end of the tube T adjacent the cathode die 18. The tube T preferably has a tapered end TE on the end which is received in the die 18 with surface TM adjacent thereto having a smaller diameter than the maximum diameter of section TE. A D.C. power source, such as a rectifier 44, has its positive terminal connected to brushes 46 mounted on the frame 2 and its negative terminal connected to a socket 48 mounted on sleeve 14. A collector ring 50 which is mounted on the spindle 4 for rotation therewith is contacted by the brushes 46. Cable 52 connects the collector ring 50 to the rod 38.

Figure 5:
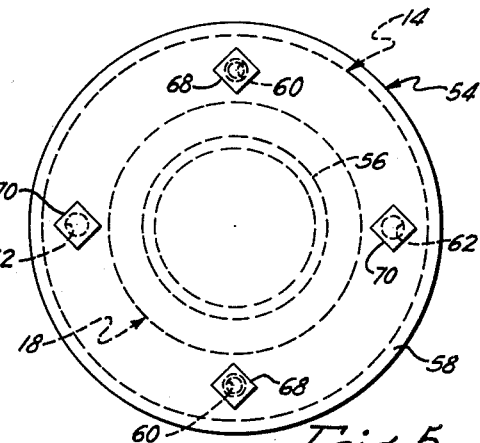
FIGURE 5 is a view looking toward the left end of FIGURE 4.
Figure 4:
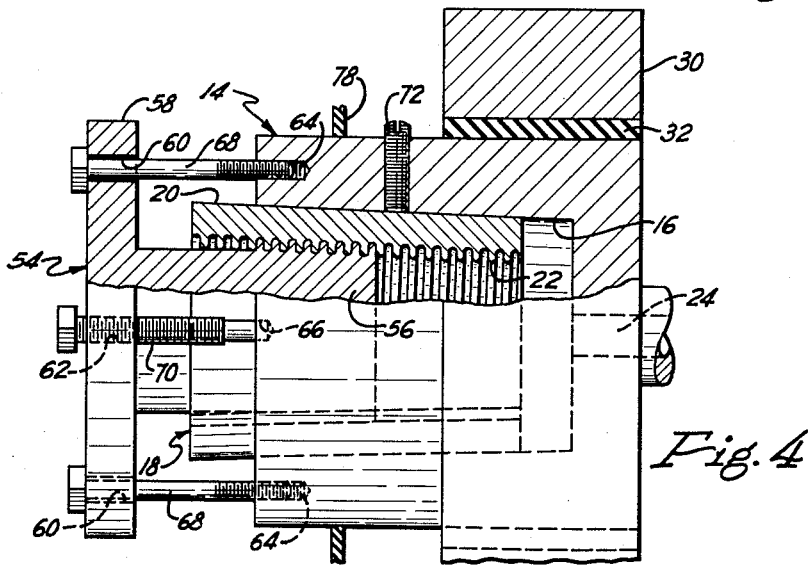
FIGURE 4 is an enlarged view, partly in section, of a tool in position to insert or remove the die from the machine of FIGURE 1.

In operation, the die 18 is inserted into sleeve 14 by means of the tool 54 shown in FIGURES 4 and 5. The tool 54 consists of a threaded shank 56 and a flange 58. Diametrically opposed holes 60 are drilled in the flange 58 and threaded holes 62 are provided in the flange 58 and are spaced 90 degrees from the holes 60. Tapped holes 64 are provided in the end of holder 14 and are spaced from the axis of the holder in the same position as the holes 60 from the axis of tool 54. Shallow holes 66 are provided in the end of holder 14 and are spaced from the axis of the holder 14 in the same manner as holes 62 are spaced from the axis of tool 54. To force the die 18 into opening 16, the die is placed in the opening, tool 54 is threaded into die 18, bolts 68 are then passed through openings 60 and threaded into opening 64 as shown in FIGURE 4. Tightening of bolts 68 forces the tool 54 and the die 18 into close engagement with the walls of opening 16. Tool 54 is then removed and the tube T is placed in chuck 8 and centered therein by means of screws 12. To remove the die 18, tool 54 is threaded into the die and bolts 70 are threaded through holes 62 into guide holes 66 as shown in FIGURE 4. Tightening of bolts 62 forces the tool 54 and the die 18 outwardly to release it from engagement with the walls of opening 16. If desired, a set screw 72 may be used to positively hold the die 18 from movement in the hole 16. The slope of the inner portion of die 18 taken on the crest of threads is substantially equal to the slope of the surface TE and the diameter of the surface TE is preferably slightly greater than the desired diameter of the crest of the threads. The threads 22, except for the crests thereof, are preferably coated with electrical insulating material 73 as shown in FIGURE 2. If desired, all of the thread may be coated with the insulating material which is then removed from the crests in any suitable manner. The tube T is supported in the chuck 8 and centered therein by means of the screws 12. Brass rod 38 and plug 40 are then inserted into the tube T as shown in FIGURE 1. The tube T is inserted into the die 18 a distance equal to the length of the threads to be formed with a narrow space 74 between the surface TE and die 18. A shroud 76 having rubber collars 78 and 80 thereon is placed around the sleeve 14 and the tube T. The shroud 76 is preferably made of stainless steel with a window of Plexiglas or other transparent material therein. An air intake 82 is provided at the top thereof. An opening 84 in the bottom of the shroud leads to a sump 86 and an exhaust fan 88. A conduit 90 leads from the sump to the pump 28. The spindle 4 is then started in rotation and the lead screw 36 causes the die 18 to move forwardly over the tube T. At the same time electrolyte is caused to flow through the opening 74 and current is delivered from rectifier 44 to tube T and to the die 18. The electrolyte may be of various compositions but one found to be particularly suitable contains about 180 grams per liter of NaCl, 20 g. per liter of boric acid and 9 g. per liter of sulphuric acid. Other electrolytes which may be used include a mixture containing 180 g. per liter NaCl, 20 g. per liter of boric acid, 15 g. per liter of sulphuric acid, a composition containing 180 g. per liter of NaCl, 20 g. per liter of boric acid, a composition containing 5 g. per liter of sulphuric acid, a composition containing 20 g. per liter of sulphuric acid, and a composition containing 20 g. per liter of sulphuric acid and 20 g. per liter of NaCl. The electrolyte is continuously circulated as the operation proceeds. The exhaust fan 88 pulls air through the opening 82 and separates the air and evolved hydrogen from the electrolyte. The length of the die 18 is so proportioned and the speed of feed is so regulated that the teeth will be completely formed by the time the last tooth on the die 18 reaches the end of the tube T. It will be seen that the teeth 22 are moving toward the surface TE which has the same taper as that of the teeth to be formed. It will also be seen that the movement of the spindle 4 and that of sleeve 14 is such that there is a helical motion between the die and tube. The shape of threads 22 in the cathode die 18 should be different than the shape of the thread forms desired on surface TE. The exact shape desired for threads 22, the amount of insulation between threads 22, and/or the relative width of electrically exposed crests to the separation of crests depends on the thread form desired. Furthermore, the threaded portion of die 18 may be longer than the surface to be threaded. For uniform threads, we have found it desirable that die 18 have at least twice as many threads as the number desired on the surface TE.

Figure 6:
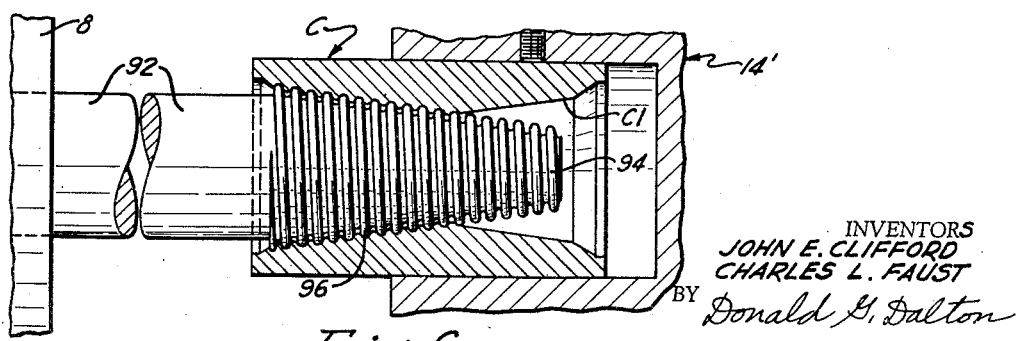
FIGURE 6 is a fragmentary sectional view showing the apparatus used in cutting female threads.

In the embodiment of our invention shown in FIGURE 6 a cathode die 92 having a tapered forward portion 94 with teeth 96 thereon is mounted inside a coupling C on which the threads are to be formed. The inner surface C1 of the coupling is preferably tapered from both ends as shown with the diameter being slightly less than that of the crests of the threads to be formed. The die threads 96 except for being male threads are essentially the same as threads 22. Coupling C may be mounted in a modified sleeve 14' corresponding to sleeve 14 and the die 92 may be mounted in the chuck 8. Current can be supplied to the coupling C through the chuck 8. The portion of the coupling C not to be threaded is coated with an insulating material and the threads of the die 92 are prepared in the same manner as the threads of die 18. The die 92 is inserted into the coupling C until it reaches the end of the surface to be threaded. The machine is then started in operation in the same manner as before with power being supplied from the rectifier 44. Coupling C is fed over the die 92 until the threads are completely formed. The coupling C is then removed and reversed and the threads formed in the other end.

While two embodiments of our invention have been shown and described, it will be apparent that other adaptations and modifications may be made without departing from the scope of the following claims.

We claim:

1. Apparatus for making a tapered male thread on a tube comprising means for supporting the tube, a non-erodible cathode die having a helical female thread thereon, the threaded portion of said die being substantially longer than the surface to be threaded and arranged at substantially the same taper as the thread to be formed, the exposed surface of the crest of the die thread being of electrical conductive material and the remaining surface of the die thread being of electrical insulating material, means for supporting said cathode die around said tube coaxially therewith and with a small space between the die and the surface of the tube to be threaded, means for closing the end of the tube adjacent the cathode die, means for causing helical motion between said die and said tube, means for flowing an electrolyte through the space between the tube and the die, a source of D.C. power, and means connecting said power source to said cathode and tube.

2. Apparatus for making a tapered male thread on a tube comprising a rotatable spindle, a rod of electrically conducting material supported by said spindle for rotation therewith, a chuck mounted on said spindle for rotation therewith and supporting said tube, said rod passing through said chuck and tube and supporting a plug in the end of the tube to be threaded, a non-erodible cathode die having a female thread thereon, the threaded portion of said die being substantially longer than the surface to be threaded and arranged at substantially the same taper as the thread to be formed, the exposed surface of the crest of the die thread being of electrical conductive material and the remaining surface of the die thread being of electrical insulating material, a sleeve for supporting said cathode die around the tube coaxially therewith and with a small space between the die and surface of the tube to be threaded, said sleeve having an opening therein, means for flowing an electrolyte through said opening and through the space between the tube and the die, means for rotating said spindle, means for feeding said sleeve and said die forwardly over said tube as the spindle rotates, a source of D.C. power, means connecting said power source to said cathode, and means connecting said power source to said rod.

3. The method of making a tapered thread on a workpiece comprising providing a workpiece having a tapered surface, providing a threaded non-erodible cathode die having a helical thread thereon, the threaded portion of said die being substantially longer than the surface to be threaded and arranged at substantially the same taper as the thread to be formed, coating all but the crest of the thread of said die with an insulating material, telescoping the cathode die and workpiece one within the other with their small ends facing in the same direction until there is a small uniform space between the die and tapered surface of the workpiece to be threaded, then causing helical motion between said die and workpiece while flowing an electrolyte through the space between the workpiece and the die, and at the same time causing a substantially constant direct current to flow between said workpiece and said die.

4. The method of making a tapered female thread on a workpiece comprising providing a workpiece having a tapered opening therein to be threaded, providing a non-erodible cathode die having a helical thread thereon, the threaded portion of said die being substantially longer than the surface to be threaded and arranged at substantially the same taper as the thread to be formed, coating all but the crest of the thread of said die with an insulating material, inserting the small diameter end of said die through the large diameter end of said tapered opening until there is a small uniform space between the die and the surface of the workpiece to be threaded, then causing helical motion between said die and workpiece while flowing an electrolyte through the space between the workpiece and the die and at the same time causing a substantially constant direct current to flow between said workpiece and said die, and continuing said helical movement and current flow until the large end of the die is adjacent the large end of said tapered opening.

5. The method of making a tapered male thread on a tube comprising providing a tube having a tapered outer surface at one end and a plug in the end to be threaded, providing a non-erodible cathode die having a helical female thread thereon, the threaded portion of said die being substantially longer than the surface to be threaded and arranged at substantially the same taper as the threads to be formed, coating all but the crest of the thread of said die with an insulating material, inserting the small diameter end of said tube through the large diameter end of said die until there is a small uniform space between the die and surface of the tube to be threaded, then causing helical motion between said die and said tube while flowing an electrolyte through the space between the tube and die and at the same time causing a substantially constant direct current to flow between said tube and die, and continuing said helical movement and current flow until the large end of the die is adjacent the large end of said tapered surface.

6. The method of making a tapered male thread on a tube comprising providing a tube having a plug in the end to be threaded and a tapered portion thereon to be threaded, providing a cathode die having a plurality of female threads thereon, the threaded portion of said die being substantially longer than the surface to be threaded and arranged at substantially the same taper as the threads to be formed, coating all but the crest of the threads of said die with an insulating material, coating the portion of said tube adjacent its tapered portion with an insulating material, inserting the small diameter end of said tube through the large diameter end of said die until there is a small uniform space between the die and the surface of the tube to be threaded, then causing helical motion between said die and tube while flowing an electrolyte through the space between the tube and the die and at the same time causing a substantially constant direct current to flow between said tube and said die, and continuing said helical movement and current flow until the large end of the die is adjacent the large end of said tapered surface.

References Cited in the file of this patent

UNITED STATES PATENTS

| | | |
|---|---|---|
| 2,526,423 | Rudorff | Oct. 17, 1950 |
| 2,650,979 | Teubner | Sept. 1, 1953 |
| 2,739,935 | Kehl et al. | Mar. 27, 1956 |
| 2,773,968 | Martellotti et al. | Dec. 11, 1956 |
| 2,798,846 | Comstock | July 9, 1957 |
| 2,868,705 | Baier et al. | Jan. 13, 1959 |

FOREIGN PATENTS

| | | |
|---|---|---|
| 661,273 | Great Britain | Nov. 21, 1951 |
| 789,293 | Great Britain | Jan. 15, 1958 |

OTHER REFERENCES

Steel, February 21, 1944, p. 92.